United States Patent [19]

Stewart

[11] Patent Number: 4,674,849

[45] Date of Patent: Jun. 23, 1987

[54] VEHICLE MIRROR

[75] Inventor: Robert T. Stewart, Woodinville, Wash.

[73] Assignee: Wink Corporation, Lynwood, Wash.

[21] Appl. No.: 731,366

[22] Filed: May 7, 1985

[51] Int. Cl.⁴ .............................................. G02B 5/08
[52] U.S. Cl. .................................. 350/612; 350/611; 350/631
[58] Field of Search ............... 350/600, 604, 605, 606, 350/611, 612, 627, 631, 632

[56] References Cited

U.S. PATENT DOCUMENTS

| | | | |
|---|---|---|---|
| 2,763,187 | 9/1956 | Wiener | 350/627 X |
| 2,869,425 | 1/1959 | Kershaw | 350/627 |
| 3,806,232 | 4/1974 | Gray | 350/627 X |
| 3,806,233 | 4/1974 | Stefano | 350/627 X |
| 4,575,202 | 3/1986 | McGuire | 350/627 |

Primary Examiner—Donald Watkins
Attorney, Agent, or Firm—Robert J. Schaap

[57] ABSTRACT

An auxiliary vehicle mirror device having a first attachment mechanism for attachment to a first fixed structure of the vehicle, as for example, the frame of an existing automotive vehicle rear view mirror located in the interior passenger compartment. The auxiliary vehicle mirror comprises a second attachment mechanism capable of being attached to a second portion of a second portion of the automotive vehicle, as for example, a stud or the like secured to the vehicle and which normally retains the existing vehicle mirror. The auxiliary vehicle mirror device comprises a first shell, as for example, an outer shell, and a second shell capable of being attached thereto. The first and second shells each having mating bosses. Moreover, the boss on the outer or first shell includes a spring means which is retained on the boss and forms part of the first attachment mechanism. The second attachment mechanism comprises an internally threaded nut which is secured within the boss on the first shell and is capable of threadedly receiving a threaded end of the stud secured to the windshield or other portion of the automotive vehicle.

26 Claims, 11 Drawing Figures

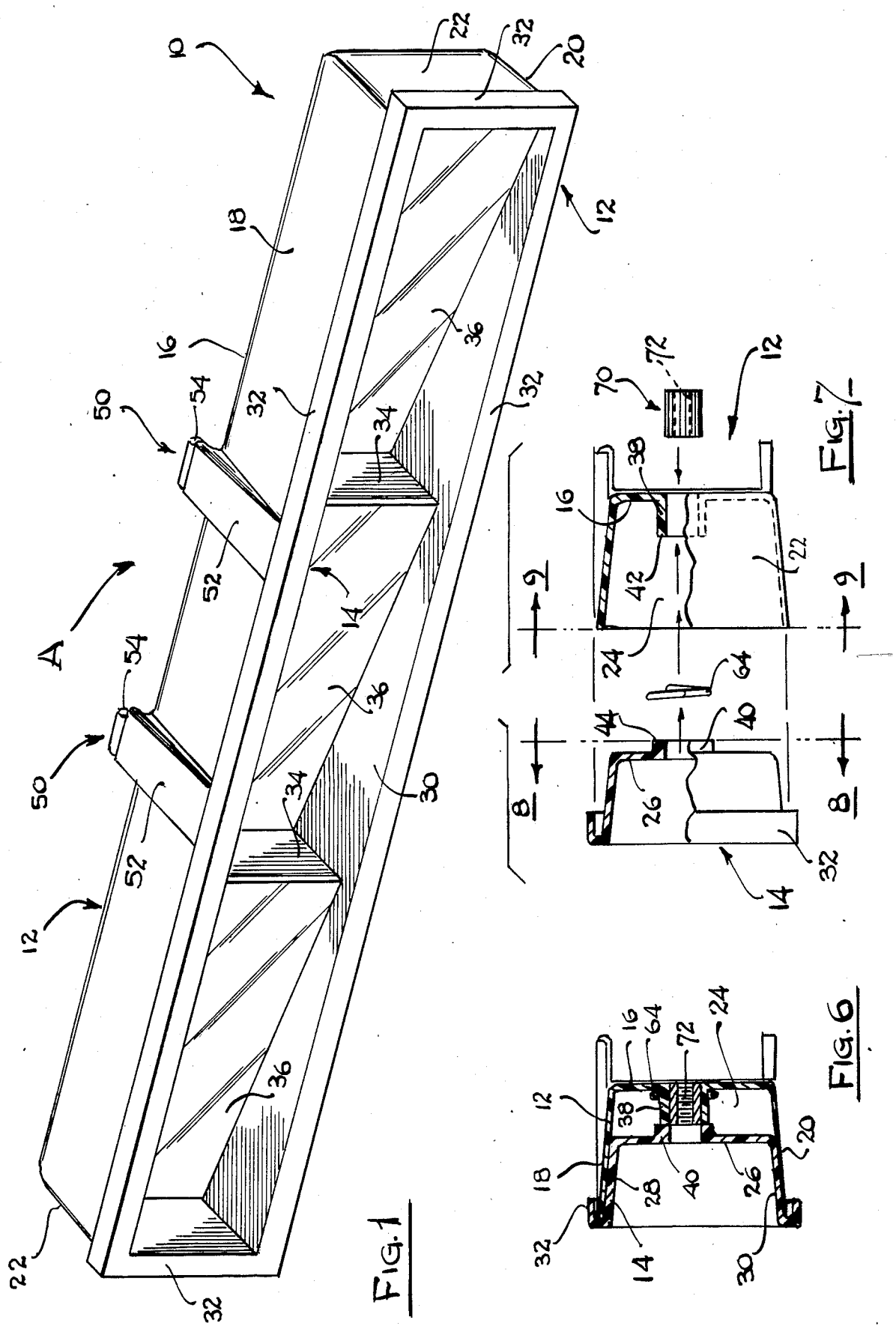

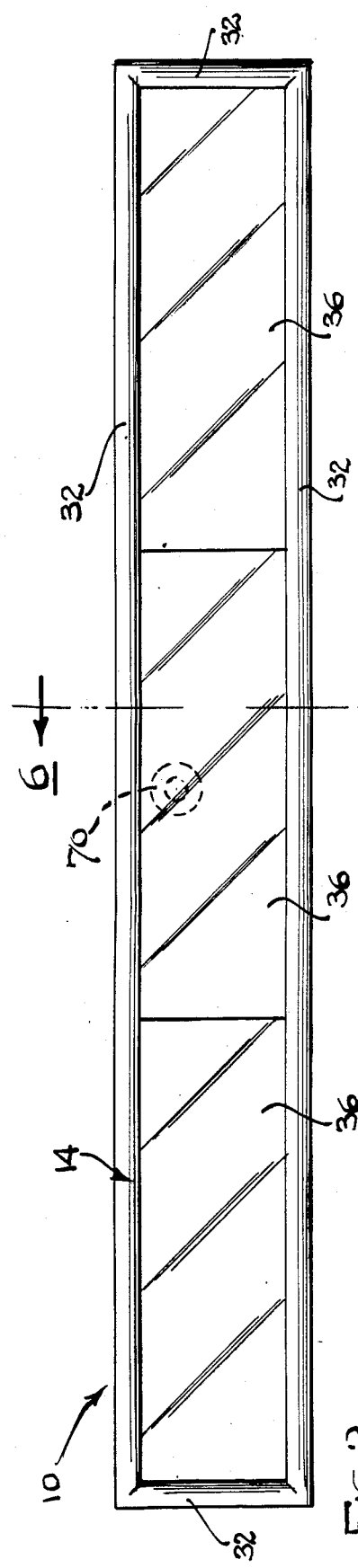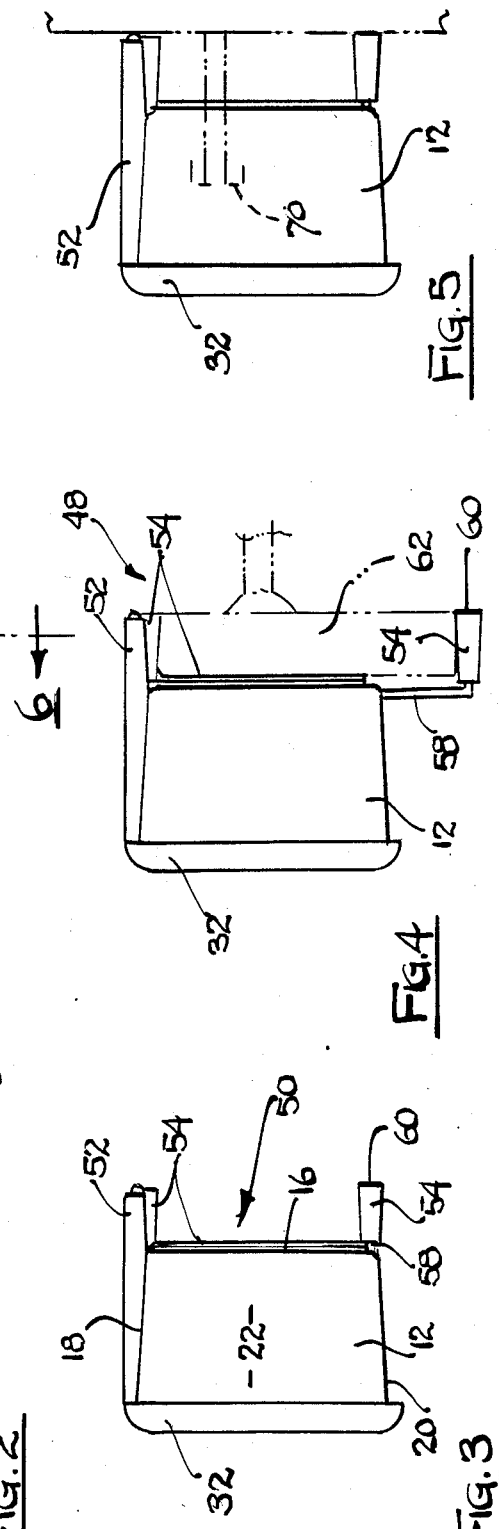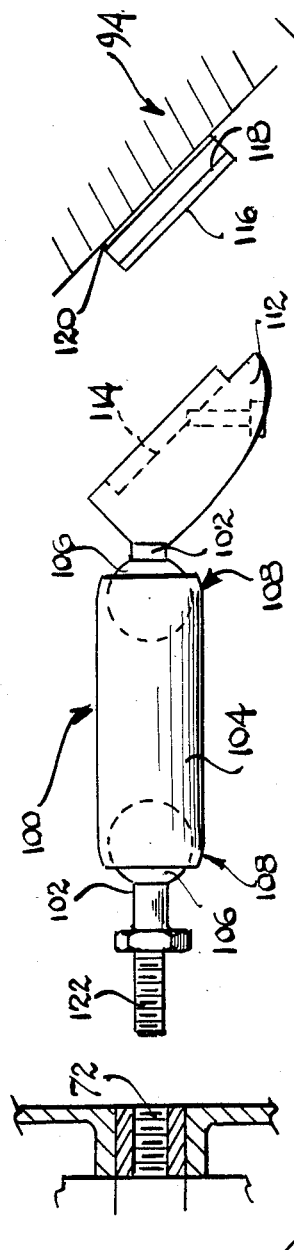

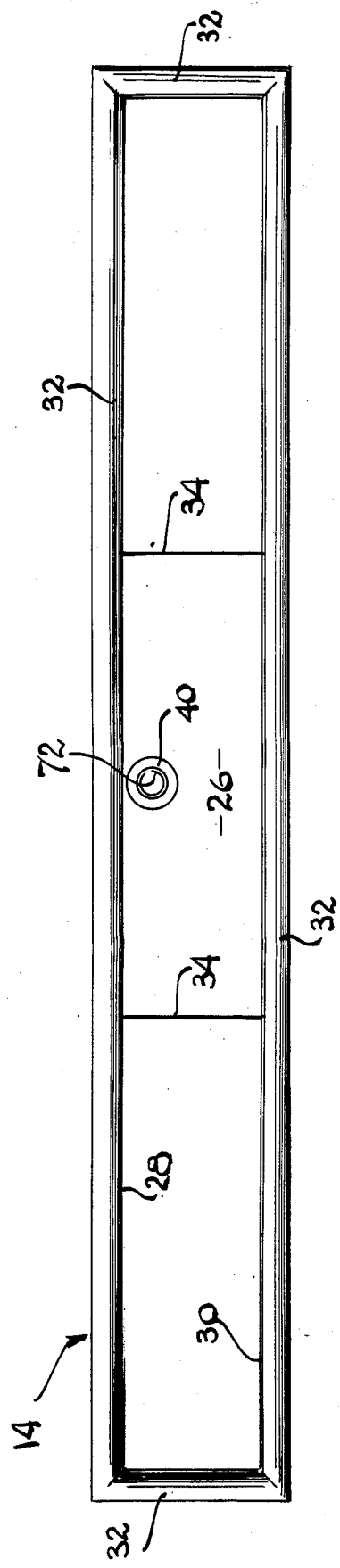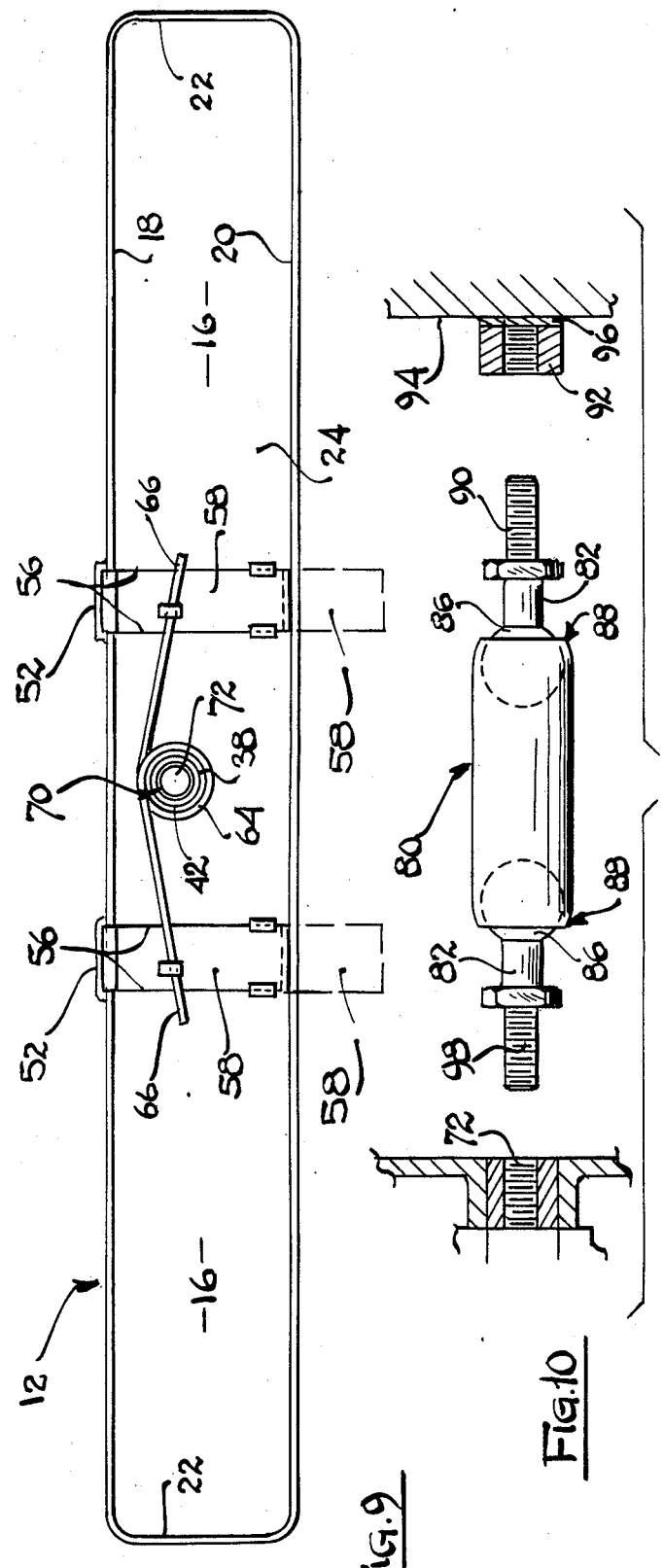

VEHICLE MIRROR

BACKGROUND OF THE INVENTION

1. Field of the Invention

This invention relates in general to certain new and useful improvements in vehicle mirrors, and more particularly, to auxiliary automotive vehicle mirrors which includes a first attachment means for attachment to a first member of an automotive vehicle and a second attachment means for attachment to a second member on an automotive vehicle.

2. Brief Description of the Prior Art

Automotive vehicles are generally always provided with a rear view mirror in the passenger compartment of the vehicle to enable the driver to see traffic conditions rearwardly and to some extent on the sides of the vehicle. Generally, these rear view mirrors may be secured to the upper header which forms part of the roof structure of the vehicle. More often these rear view mirrors are secured to the front window pane or so-called "windshield" of the automotive vehicle. These rear view mirror devices normally found in the automotive vehicles include a mirror frame which holds a mirror. The frame is connected to a mounting bracket on the windshield itself, or on the header portion of the roof structure of the vehicle. When secured to the windshield, a bracket or so-called "button" is secured to the windshield and a threaded end of a stud is threadedly secured to the button. The opposite end of the stud is threaded for attachment to the frame.

In each of the aforesaid rear view mirror devices in automotive vehicles, the stud is a threaded rod section which is secured to the bracket or button and the latter is normally adhesively secured to the windshield or otherwise, it may be rigidly affixed to the header section of the roof structure of the vehicle.

It has been recognized that the so-called "wide angled rear view mirror" is an effective safety device for use in automotive vehicles for enabling the driver to obtain a clearer and more accurate image of the traffic conditions on the sides of and to the rear of the vehicle operated by a driver. These wide angled auxiliary mirrors usually include an elongate enlarged frame adapted to carry two or more side-by-side located mirror sections. However, most commercially available automotive vehicles do not include these wide angled mirrors and they are generally only available in the secondary automotive market or so-called "automotive after market". Thus, it is necessary for the user of these wide angled mirrors to be able to conveniently and easily attach any such wide angled mirror to some existing portion of the vehicle.

In some cases, these auxiliary wide angled mirrors have been provided with attachment devices on the rearward portion thereof for attaching to the interior portion of the automotive vehicle. However, if the commercially available wide angled mirror is not adapted to directly attach to the existing rear view mirror in the passenger compartment of the vehicle, the user must engage in some elaborate attachment system to rigidly secure the auxiliary wide angled mirror. In most cases, there is no universal attachment system which enables a wide angled mirror to be attached to some existing portion of the interior compartment of an automotive vehicle in the same region as the normal rear view mirror is found.

OBJECTS OF THE INVENTION

It is, therefore, a primary object of the present invention to provide an automotive vehicle auxiliary mirror which is capable of being attached to a first structure on an automotive vehicle with a first attachment means or capable of being attached to a second fixed structure of an automotive vehicle with a second attachment means.

It is another object of the present invention to provide an automotive vehicle rear view mirror of the type stated which is provided with a first attachment means for alternative attachment to a rigid structure in the interior passenger compartment of the automotive vehicle and a second attachment means for attachment to a second fixed structure in the interior passenger compartment of an automotive vehicle.

It is another object of the present invention to provide a mirror device of the type state which includes a first shell and a second shell which are adapted to be connected together and wherein one of the shells is provided with a boss for mating attachment with a surface on the other of the shells and which first shell also includes a means for mounting a spring mechanism on the boss forming part of a first attachment means and which boss also is adapted to hold a second attachment means.

It is also an object of the present invention to provide a wide angled mirror device capable of being fixedly attached to a portion of an interior passenger compartment of an automotive vehicle and which includes a first clamping attachment means associated with a boss on a shell of the mirror and a second attachment means in the form of a threaded nut capable of receiving a threaded post or stud also associated with the boss on the shell of the mirror device.

It is an additional object of the present invention to provide an auxiliary mirror device of the type stated which can be manufactured at a relatively low cost and which is highly efficient in its operation.

It is another salient object of the present invention to provide a mirror device of the type stated which is adapted for easy and convenient attachment to a wide variety of existing structures in conventional automotive vehicles and thereby lends itself to use in a large number of commercially available automotive vehicles.

With the above and other objects in view, my invention resides in the novel features of form, constructions, arrangement and combination of parts presently described and pointed out in the claims.

SUMMARY OF THE DISCLOSURE

The invention, in a broad aspect, relates to an auxiliary rear view mirror device which has a first mounting means capable of being clamped to a fixed structure of an automotive vehicle and a second mounting means for alternatively being secured to another portion of an automotive vehicle. The auxiliary rear view mirror device more specifically is a wide angled rear view mirror which may include two or more panels of mirrors for enabling wide angled view to the rear and the sides of the vehicle.

The rear view mirror device of the invention is more specifically adapted for clamping to an existing rear view mirror frame in the interior passenger compartment in the automotive vehicle. Alternatively, the existing rear view mirror of the vehicle can be removed and the auxiliary rear view mirror device of the present invention can be threadedly secured to the threaded shaft which is secured to a bracket or so-called "button" on the windshield or other portion of the vehicle and which shaft may also hold the conventional rear view mirror of the automotive vehicle.

The rear view mirror device preferably comprises an outer shell, such as a plastic shell and an inner shell which is adapted to be received by a hollow portion of the outer shell. A boss is located on the interior portion of the outer shell and is adapted to engage with a mating surface portion on the inner shell for attachment of the two shells to form a rigid frame. The boss of the outer shell has a surface which engages the mating surface in facewise abutting contact and the two can be effectively heat sealed together in order to form the rigid securement of the two shells. Additional securement means may also be provided for this purpose.

In a more preferred embodiment of the invention, the mating surface on the inner shell also comprises an outwardly projecting boss which is initially spaced apart from the boss on the inner surface of the outer shell when the two shells are separated. Moreover, the two bosses have mating faces which abut one another for purposes of being heat sealed together.

The bosses on the inner and outer shells also serve to hold a spring device which operates spring biased expandable clamps located on the outer shell. These clamps are designed to expand for extending over an existing rear view mirror on the vehicle and contract to effectively clamp the auxiliary mirror device of the invention on the existing rear view mirror. The spring device comprises a loop which is disposed about and retained on the boss of the outer shell so that it is effectively carried thereby. In addition, the boss on the outer shell also serves to carry a second attachment means which may be in the form of a fitting. The fitting is comprised of a bore having internal threads which are sized to receive a threaded section of a stud.

In many automotive vehicles, the rear view mirror of the vehicle is normally secured to the windshield, although in some cases it may be secured to the header of the vehicle as aforesaid. When attached to the windshield, a bracket which is often referred to as a "button" is secured, as for example by an adhesive securement to the interior surface of the windshield. This button includes an internally threaded section adapted to threadedly receive a threaded end of a stud. Moreover, the opposite end of that stud is also threaded and adapted for threaded securement to a ball joint on the rear portion of a rearview mirror.

In the present invention, an auxiallary threaded stud assembly may also be provided with the auxiliary rearview mirror. This auxiliary threaded stud assembly may have one end which is threaded for securement to the button on the windshield. Alternately, one end of the auxillary threaded stud may be provided with a bracket for attachment to an adhesively secured plate on the interior surface of the vehicle windshield. The opposite end may also be threaded for securement to the auxillary rearview mirror device itself. Moreover, ball joints may be located in the threaded stud assembly in order to enable swingable movement of the auxiliary rearview mirror.

This invention possesses many other advantages and has other purposes which may be made more clearly apparent from a consideration of forms in which it may be embodied. These forms are shown in the drawings accompanying and forming part of the present specification. They will now be described in detail, for the purposes of illustrating the general principles of the invention; but it is to be understood that such detailed descriptions are not to be taken in a limiting sense.

BRIEF DESCRIPTION OF THE DRAWINGS

Having thus described the invention in general terms, reference will now be made to the accompanying drawings in which (two sheets):

FIG. 1 is a perspective view of a rear view mirror device constructed in accordance with and embodying the present invention;

FIG. 2 is a front elevational view of the rear view mirror device of the present invention;

FIG. 3 is an end elevational view of the rear view mirror device of the FIGS. 1 and 2;

FIG. 4 is an end elevational view of the rear view mirror device, similar to FIG. 3, and showing a clamping means in an expanded position;

FIG. 5 is an end elevational view of the rear view mirror device, similar to FIG. 4, and showing the use of an alternate attachment means of the mirror device of the present invention;

FIG. 6 is a vertical sectional view taken along line 6—6 of FIG. 2;

FIG. 7 is an exploded vertical sectional view, somewhat similar to FIG. 6, and showing the inner shell separated from the outer shell which forms part of the frame of the mirror device of the present invention;

FIG. 8 is a vertical sectional view taken along line 8—8 of FIG. 7 and showing a portion of the inner shell forming part of the mirror device;

FIG. 9 is a vertical sectional view, taken along line 9—9 of FIG. 7 and showing the outer shell forming part of the mirror device of the present invention;

FIG. 10 is an exploded side elevational view, partially in section, and showing an auxillary threaded stud assembly which may form part of the auxillary rearview mirror device of the present invention for securement to the windshield of an automotive vehicle; and FIG. 11 is an exploded side elevational view similar to FIG. 10, partially in section, and showing another auxillary threaded stud assembly which may form part of the auxillary rearview mirror device of the present invention for securement to the windshield of an automotive vehicle.

DETAILED DESCRIPTION OF A PREFERRED EMBODIMENT

Referring now in more detail and by reference characters to the drawings which illustrates a preferred embodiment of the invention, A designates an auxillary rear view mirror device which is adapted for attachment to a portion of an existing automotive vehicle and particularly in the passenger compartment of an automotive vehicle.

The rear view mirror device of the present invention is preferably a wide angled mirror device and is adapted for use in essentially all types of automotive vehicles which includes trucks, passenger vehicles, boats, airplanes, and the like.

The rear view mirror device of the present invention comprises a main frame 10 and which is comprised of an outer frame shell 12 and an inner frame shell 14. The outer frame shell 12 is somewhat rectangularly shaped and includes a vertically disposed back wall 16 and a top wall 18 and bottom wall 20 which are connected by end walls 22. In this way, the outer frame shell 12 forms an enclosing outer section with an interior compartment 24 which is adapted to receive the inner frame shell 14, in the manner as illustrated in FIG. 6 of the drawings.

The inner frame shell 14 is similarly constructed so as to have a somewhat rectangular shape as illustrated and includes a rear wall 26 facing the rear wall 16 of the outer shell 12. In like manner, the inner shell 14 has an upper wall 28 adapted to engage the interior surface of the wall 18 and a bottom wall 30 adapted to engage the interior surface of the lower wall 20 when the two are fitted together in the manner as illustrated in FIG. 6. The front edge of the inner shell 14 is provided with an outwardly flaring flange 32 which is adapted to extend over and curl slightly rearwardly of the outer shell 12 also in the manner as illustrated in FIGS. 3 through 6 of the drawings.

The inner shell 14 is provided with a plurality of longitudinally spaced apart obliquely extending vertically disposed supporting walls 34 which suitably retain rear view mirror plates 36. In this way, each of the mirror plates 36 are effectively parallel to one another although they extend obliquely with respect to the rectangularly shaped housing 10 in the manner as illustrated in FIG. 1 of the drawings. In this way, by using a plurality of the obliquely extending longitudinally spaced apart mirrors, the user of the rear view mirror device is able to achieve a wide angled view to the rear and the sides of the vehicle. The various rear view mirror plates 36, usually comprise a glass plate with a metalized surface on the rear portion thereof. Moreover, they may be secured to the walls 34 by means of an adhesive or similar mounting means.

The frame 10 and particularly, the shells 12 and 14 can be formed of any suitable material, as for example, plastics and reinforced plastics and which are formed by suitable molding techniques. Thus, and in a preferred embodiment, the shells 12 and 14 are formed of a polyvinyl material, although they may be formed of polyethylene, polystyrene, etc. These shells could also be formed of various metals and other structural materials.

The rear view mirror device A of the present invention comprises a unique mounting and securement system which includes a cylindrically shaped boss 38 integrally formed on and projecting forwardly from the rear wall 16 from the outer frame shell 12. This unique mounting and securement system also comprises a cylindrically shaped rearwardly projecting boss 40 on the exterior surface of the rear wall 26 of the inner shell 14, in the manner as best illustrated in FIGS. 6 through 9 of the drawings.

The boss 38 is provided with a front face 42 and the boss 40 is provided with a rear face 44 which faces are adapted to be engaged in abutting relationship when the two shells are fitted together, in the manner as illustrated in FIG. 6. In this way, the two bosses can be sealed to one another by the application of radio frequency energy, or ultrasonic energy, or the like. In effect, through the application of the energy in the proper frequency, the bosses somewhat melt at the faces 42 and 44, and in effect, flow together and form an integral bond therebetween. In this way, the inner shell 14 is fixedly retained within the outer shell 12. Moreover, inasmuch as the flange 32 has a rearwardly facing section, it could crimp around a bead on the exterior forwardly located portion of the outer shell 12.

The bosses 38 and 40 are also hollow, in the manner as illustrated, and function as part of a first mounting means and function as part of a second mounting means. The first mounting means 48 comprises a clamping means 50, which is more fully illustrated in FIGS. 3 and 4 of the drawings. The clamping means 50 comprises a pair of longitudinally spaced apart ribs 52 which are integral with the top wall 18 and extend rearwardly beyond the rear wall 16 in the manner as illustrated. These ribs 52 may be covered with a suitable covering material 54, as for example, a neoprene rubber or other covering material. In addition, the rear wall 16 is provided with a pair of vertically disposed, longitudinally spaced apart channels 56, each of which slidably receive separate vertically disposed legs 58 and which legs 58 are each provided at their lower ends with rearwardly projecting fingers 60. These fingers 60, along with the rearwardly projecting portions of the ribs 52, function as individual clamping mechanisms which operate together and constitute a portion of the first mounting means 48.

The vertically disposed legs 58 will shift downwardly within the channels 56 and thereby enable the fingers 60 and the rib 52 to clamp over an existing device, as for example, an existing conventional rear view mirror device 62 shown in phantom lines in FIG. 4 of the drawings. In this way, the auxiliary rear view mirror device of the present invention can clamp on an existing rear view mirror in an automotive vehicle, much in the manner as shown in FIG. 4.

The legs 58 are spring biased upwardly, such that the fingers 60 normally are not extended downwardly, in the manner as shown in FIG. 4. Rather, in the relaxed position, the fingers will normally assume the position illustrated in FIG. 3. This biasing action results from a spring 64 which is wound about and retained on the boss 38. The spring 64 also includes a pair of integrally formed outwardly extending arms 66 and each one of which is secured to one of the vertically extending legs 58. These arms 66 forming part of the spring 64 may be secured to the legs 58 by extending through slots formed in the legs 58. Other means for securing the spring arms 66 to the legs 58 may also be provided.

The auxiliary rear view mirror device A of the present invention also comprises a second mounting means 70 which includes a nut 72 press fitted into the bore of the boss 38, in the manner as illustrated in FIGS. 5 and 6 of the drawings. This nut 72 also includes an internal bore and is provided with an internally threaded section for being threadedly mounted onto a bolt or similar member presently existing in the passenger compartment of an automotive vehicle. In the case of the conventional rear view mirror, the frame is often secured to a bracket on the windshield and this bracket includes a bolt with an externally threaded section when the mirror frame itself is removed. Hence, the auxiliary rear view mirror device A of the present invention can be secured to the threaded bolt forming part of the bracket of the existing conventional rear view mirror device by merely threading the same using the internally threaded nut 72.

Thus, it can be observed that the present invention provides a dual mounting system for removably mounting a wide angled rear view mirror device in the passenger compartment of a vehicle. This dual mounting means includes a clamping means 50, as aforesaid, as well as the threaded mounting means 70, as aforesaid. Moreover, it can be observed that the clamping means utilizes the bosses 38 and 40 as an integral means to hold the spring 64. In addition, it is a salient feature of the second and threaded mounting means for retaining the internally threaded nut 72. In like manner, the two bosses constitute primary elements in enabling the two shells to be rigidly secured together. Thus, the rear view mirror device of the present invention utilizes a pair of relatively simple bosses which perform at very least three crucial functions and which thereby lend to easy manufacturing and assembly and lower costs.

FIG. 10 illustrates an auxillary stud assembly 80 which may be used with the auxillary rearview mirror device of the present invention. In this case, the stud assembly 80 internally includes a pair of elongate stud sections 82 and a centrally located housing 84. The stud sections 82 are integral with ball sections 86 captured in opened ends of the housing 84 and form oppositely disposed conventional ball joints 88. In this case, inasmuch as the ball joints may be conventional, and merely permit the stud sections 82 to be movable relative to one other, these ball joints are neither illustrated nor described in any further detail herein. One of the threaded stud sections 82 is externally threaded at 90 for threaded securement to a button 92 or similar member which is secured to an automotive vehicle windshield 94 by means of an adhesive layer 96. The opposite threaded stud section 82 is similarly provided with a threaded end 98 for securement to the fitting or threaded nut 72. In this way, the auxillary rearview mirror device can be used with the second attachment means and also can be mounted for limited pivotal movement.

FIG. 11 illustrates another auxillary stud assembly 100 which may be used with the auxillary rearview mirror device of the present invention. In this case, the stud assembly 100 internally includes a pair of elongate stud sections 102 and a centrally located housing 104 which are also conventional. One of the stud sections 102 is provided with a bracket 112 having an internal groove 114 which is adapted to slidably engage flanges 116 on a plate 118. By further reference to FIG. 11 it can be seen that the plate 118, which is also often referred to as a "button" is secured to an automotive vehicle windshield 94 by means of an adhesive layer 120. The opposite stud section 102 is similarly provided with a threaded end 122 for securement to the fitting or threaded nut 72. In this way, the auxillary rearview mirror device of FIG. 11 can also be used with the second attachment means and also can be mounted for limited pivotal movement.

Thus, there has been illustrated and described a unique and novel rear view mirror device for automotive vehicles which is provided with a dual mounting system and which is capable of being manufactured and assembled easily and at a relatively low cost. Thus, the present invention fulfills all of the objects and advantages which have been sought. It should be understood that many changes, modifications, variations, and other uses and applications will become apparent to those skilled in the art drawings. Therefore, any and all such changes, modifications, variations, and other uses and applications which do not depart from the spirit and scope of the invention are deemed to be covered by the invention which is limited only by the following claims.

Having thus described my invention, what I desire to claim and secure by Letters Patent is:

1. An auxillary vehicle mirror device for attachment to a first portion of a vehicle through a first attachment means or to a second portion of the vehicle through a second attachment means, said auxiliary vehicle mirror device comprising:
   (a) an outer vehicle mirror device shell,
   (b) an inner vehicle mirror device shell capable of being attched to the outer shell,
   (c) a boss on the outer shell projecting toward the inner shell,
   (d) a mating surface portion on the inner shell for attachment to said boss,
   (e) first attachment means operable with a clamping action comprising a spring biased expandable clamp means on the outer shell,
   (f) spring biasing means mounted on and carried by said boss on the outer shell,
   (g) second attachment means carried by said boss and extending to an exterior portion of said outer shell to engage a second portion on said vehicle, and
   (h) at least one mirror carried by one of said shells to enable a view to the rear of the vehicle on which the device is used.

2. The vehicle mirror device of claim 1 further characterized in that the mating surface portion on the inner shell is on another boss on the inner shell which projects toward the boss on the outer shell.

3. The vehicle mirror device of claim 2 further characterized in that the boss on the inner shell has a mating surface adapted for attachment to the boss on the outer shell, and adhesive means enables a permanent attachment of the two bosses in a rigid relationship.

4. The vehicle mirror device of claim 1 further characterized in that the spring biasing means has a section wound about the boss on the outer shell and also has sections extending to the clamp means.

5. The vehicle mirror device of claim 1 further characterized in that said clamp means comprises at least one upper rearwardly extending member and at least one lower rearward extending member and one of which members is vertically movable relative to the other.

6. The vehicle mirror device of claim 1 further characterized in that the at least one mirror is carried by said inner shell.

7. The vehicle mirror device of claim 6 further characterized in that a plurality of spaced apart mirrors are carried by said inner shell.

8. The vehicle mirror device of claim 1 further characterized in that said second attachment means is a fitting which is carried in an interior bore of the boss on said outer shell and is adapted to receive a threaded section of a member on the second portion of the vehicle.

9. The vehicle mirror device of claim 8 further characterized in that the first attachment means comprises the spring biased expandable clamp means and is adapted to be attached to the existing automotive rearview mirror located in the passenger compartment of an automotive vehicle.

10. An auxiliary vehicle mirror device for attachment to a first portion of a vehicle through a first attachment means or to a second portion of the vehicle through a second attachment means, said auxiliary vehicle mirror device comprising:
   (a) a mirror frame having a front somewhat vertically disposed wall and a rearwardly spaced apart somewhat vertically disposed wall,
   (b) a first boss on the rearwardly disposed wall and projecting forwardly toward the front vertically disposed wall,
   (c) a second boss on the front vertically disposed wall and projecting rearwardly toward the boss on the rearwardly disposed wall, (d) a mating surface on each of said first and second bosses adapted to be engaged in mating relationship and sealed to one another, (e) a first attachment means operable with a clamping action comprising a spring biased expandable clamp means on the outer shell and having a spring biasing means mounted on and carried by the bosses, (f) a second attachment means carried by at least the boss on the rearwardly presented wall, and (g) at least one mirror carried by said mirror frame to enable a view to the rear of the vehicle on which the device is used.

11. A vehicle mirror assembly for attachment to a first portion of a vehicle through a first attachment means or to a second portion of the vehicle through a second attachment means, said vehicle mirror assembly comprising:

(a) a mirror housing, (b) first attachment means operable with a clamping action for clamping to a portion of the vehicle, (c) a boss forming part of said mirror housing, (d) second attachment means comprising said boss with an internally threaded section of said boss on the housing projecting rearwardly thereon, (e) a stud having at least one threaded end for attachment to said boss and also having a ball joint associated therewith, and (f) at least one mirror carried by said housing.

12. The vehicle mirror assembly of claim 11 further characterized in that said stud has an opposite threaded end for attachment to a button on the windshield of a vehicle.

13. The vehicle mirror assembly of claim 11 further characterized in that a plurality of spaced apart mirrors are carried by said housing.

14. The vehicle mirror assembly of claim 11 further characterized in that said second attachment means comprises a fitting which is carried in an interior bore of the boss and which fitting forms the internally threaded section which is adapted to receive a threaded end of said stud.

15. The vehicle mirror assembly of claim 11 further characterized in that the first attachment means comprises a spring biased expandable clamp means and is adapted to be attached to an existing automotive rearview mirror located in the passenger compartment of an automotive vehicle.

16. The vehicle mirror assembly of claim 12 further characterized in that a pair of ball joints are located intermediate the opposite ends of said stud.

17. The vehicle mirror assembly of claim 11 further characterized in that one end of said stud is provided with a bracket having a slot receiving a plate secured to an, automotive vehicle windshield.

18. An auxiliary vehicle mirror device for attachment to a first portion of a vehicle through a first attachment means or to a second portion of the vehicle through a second attachment means, said auxiliary vehicle mirror device comprising:

(a) an outer vehicle mirror device shell, (b) an inner vehicle mirror device shell capable of being attached to the outer shell, (c) means extending between and connecting the outer and inner shells together as a single shell structure, (d) first attachment means operable with a clamping action comprising a spring biased expandable clamp means on the shell structure, (e) second attachment means carried by said shell structure and extending to an exterior portion of said shell structure to engage a second portion of said vehicle, and (f) a mirror carried by said shell structure to enable a view to the rear of the vehicle on which the device is used.

19. The vehicle mirror device of claim 18 further characterized in that said means extending between and connecting comprises:

(a) a boss on one of the shells projecting toward the other of the shells, and (b) a mating surface portion on the other of the shells for attachment to said boss.

20. The vehicle mirror device of claim 19 further characterized in that the mating surface portion comprises another boss which projects toward the first identified boss.

21. The vehicle mirror device of claim 18 further characterized in that a spring biasing means has a section wound about the boss on the outer shell and also has sections extending to the clamp means.

22. An auxiliary vehicle mirror device for attachment to a structural portion of a vehicle through an attachment means, said auxiliary vehicle mirror device comprising:

(a) an outer vehicle mirror device shell, (b) an inner vehicle mirror device shell capable of being attached to the outer shell, (c) means extending between and connecting the outer and inner shells together as a single shell structure, (d) attachment means operable with a clamping action comprising a spring biased expandable clamp means on the shell structure, (e) spring biasing means mounted on and carried by said housing and operatively said expandable clamp means, and (g) a mirror carried by said shell structure to enable a view to the rear of the vehicle in which said device is used.

23. The vehicle mirror device of claim 22 further characterized in that the means extending between and connecting comprises:

(a) a boss on the outer shell projecting toward the inner shel, and (b) a mating surface portion on the inner shell for attachment to said boss.

24. The vehicle mirror device of claim 22 further characterized in that a second attachment means is carried by said shell structure and on an exterior portion of said outer shell which can be engaged by a second portion of said vehicle to mount said mirror device.

25. The vehicle mirror device of claim 22 further characterized in that said clamp means comprises at least one upper rearwardly extending member and at least one lower rearwardly extending member and one of which members is vertically movable relative to the other.

26. The vehicle mirror device of claim 22 further characterized in that a plurality of mirrors are carried by said shell structure.

* * * * *